Patented Dec. 3, 1940

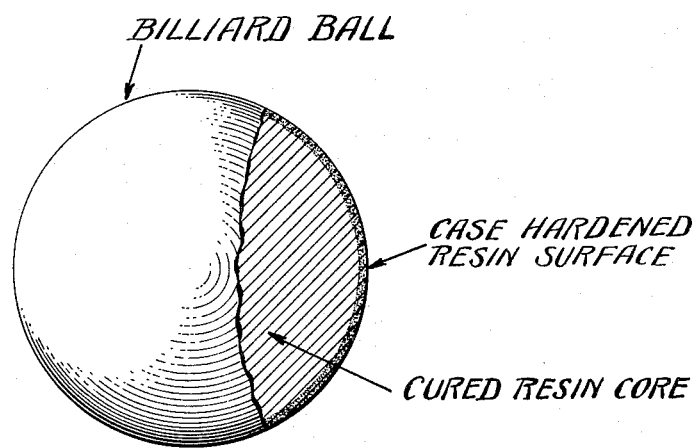

2,223,394

UNITED STATES PATENT OFFICE 2,223,394

BILLIARD BALL AND METHOD OF MANUFACTURE

Wesley R. Thompson, Metuchen, N. J., assignor to Catalin Corporation of America, a corporation of Delaware Application September 3, 1938, Serial No. 228,405

13 Claims. (Cl. 18—55)

This invention relates to the manufacture of billiard balls having high resiliency and elasticity characteristics and more particularly to a method of surface hardening billiard balls made of phenol-formaldehyde resin and containing sufficient water dispersed throughout the mass of the resin to give it a cellular structure conducive to resiliency, elasticity and hardness.

In the manufacture of billiard balls, of desired hardness, elasticity and resiliency, from certain hydrophilic phenol-formaldehyde resins, difficulties have been encountered in obtaining sufficient hardness in the resin to hold the filler material intact so that the abrasion encountered when the ball is in play will not cause parts of the filler to tear away and mark the billiard table cloth. The principal difficulty in obtaining the necessary hardness in this type of billiard ball is due to the fact that the resin, which contains an appreciable amount of filler and accordingly is very viscous, is difficult to dehydrate sufficiently before solidifying to effect adequate hardening of the resin. Furthermore, if the resin were dehydrated completely or if a hydrophobic type of resin were used the billiard ball would not have the designed resiliency and elasticity.

In accordance with the present invention, I have discovered that the desired hardness in billiard balls made of hydrophilic phenol formaldehyde resin may be obtained, without adversely affecting the other desirable characteristics of the ball, by a curing treatment, of the formed ball that eliminates the water in the surface layer of the billiard ball and forms a thin, dry, case-hardened layer around the periphery of the ball. This layer is sufficiently hard to resist the frictional contact between the ball and the table cloth when the ball is in play and, therefore the filler will not be torn away from the resin and the ball will not mark the cloth. This dehydration treatment does not materially affect the center resin mass of the ball and therefore the ball still retains the desired elasticity and resiliency. The treatment that I have discovered for hardening billiard balls comprises a supplemental heating of the ball for a sufficient period of time and at a regulated temperature to dehydrate the resin material on the surface of the ball and for a certain distance into the ball. In other words, this heating has a case hardening effect upon the billiard ball so that the hardness of the outer portions of the ball is substantially increased. The case-hardening treatment may be carried out either under vacuum or atmospheric pressure and I have found it advantageous to exclude at least a portion of the air from the balls during this treatment.

Unless the billiard balls are protected from the atmosphere during curing, this case hardening treatment of the balls with elimination of residual water from the surface will cause some discoloration of the resin surface of the ball, which is apparently due to oxidation. Discoloration may be prevented substantially by curing the balls under oil or in the presence of an inert gas, such as for example, nitrogen or carbon dioxide. In the event surface discoloration has taken place, I have found that it may be removed by machining or otherwise removing a portion of the hardened surface layer of the balls. When this is contemplated, the balls, prior to the case hardening treatment, may be made oversized and after the case hardening treatment during which the discoloration forms, the balls may be machined down to the proper size thereby eliminating the discolored surface layer.

In my process the hydrophilic phenol-formaldehyde resin, from which the billiard balls are to be made, is preferably first cast into hot molds and vacuum applied for a few minutes time, after which the material is cured for a period of a few days until the desired initial hardness is obtained. From the stock material thus formed, which may be in rod form and which is partially hardened, the billiard balls are machined or otherwise formed. In the event that the balls are to be reduced in size after the case hardening treatment described above, they are cast originally to a slightly larger diameter than that of the finished billiard ball. After the initial hardening, the billiard balls are further cured, to provide the case hardening effect, in accordance with my invention, for a period of a few days. During this curing the air may be partially or fully excluded from the balls by covering them with some material such as oil or sawdust, or by applying vacuum or inert gas, as described above. This supplementary curing treatment case hardens the ball such that it will have the necessary hardness to prevent marking of the table cloth. The ball will nevertheless have the desired resiliency and elasticity characteristic of the cellular structure resins with water colloidally dispersed throughout this structure, such as described in the Pollak and Ostersetzer Patent No. 1,854,600, issued April 19, 1932.

In accordance with a specific but non-limiting example, the process of my invention for producing case-hardened billiard balls may be carried out as follows: Phenol-formaldehyde resin having a mol ratio of at least 1.5 mols, and preferably 2 to 3 mols, of formaldehyde to 1 mol of phenol and produced by a condensation reaction in the presence of an alkaline catalyst followed by acidification, and dehydrated to a residual water content of about 8% is prepared. The details of the process may follow generally those described hereinafter. This resin is then cast into hot molds and evacuated in these molds for about 3 to 5 minutes. This vacuum treatment I have found removes all voids in the surface of the resin and prevents it from becoming pitted. The pitted effect is likely to occur when the resin has been dehydrated a little too far and begins to gel before the air in the resin has opportunity to rise and liberate itself. After this vacuum treatment the cast resin is cured for four days at a temperature of about 80° C. and the resulting product has a hardness of B25 at 20° C. as determined by the well-known Rockwell hardness test using a ⅛-inch ball and 60 kg. load. The phenol-formaldehyde resin stock thus produced is now machined to form the billiard balls of a size approximately 0.080" greater than the desired final ball size. These balls are then subjected to a supplementary curing treatment by packing them in sawdust and heating them for three days at about 80° C. at atmospheric pressure. As a result of this treatment, the hardness of the surface resin is increased to B95 at 20° C., according to the Rockwell test. The balls are then turned down to correct size, that is, the additional 0.080" in diameter of the ball is removed by machining. This removes the yellow color on the surface of the ball although the surface of the finally machined ball still has the desired hardness, showing that the effect of the case-hardening treatment has extended to a depth of at least 0.080" beneath the surface of the treated balls. After this machining and polishing operation the balls are ready for use.

In addition to the required hardness of the billiard balls, as above described, they must also possess certain resiliency, elasticity, specific gravity, and light stability characteristics. As above shown, the requirement as to hardness can be obtained by my special case hardening treatment, while the resiliency and elasticity characteristics are provided by the hydrophilic resin with cellular structure and colloidally dispersed water therein. The other named characteristics I have obtained primarily by proper formulation of the phenol-formaldehyde resin from which the billiard balls are made. From various tests, I have found that the usual type of hydrophilic phenol-formaldehyde resins are undesirable as billiard ball material and that changes in the mol ratios of the phenol and formaldehyde, by which the characteristics of the product may be substantially varied, were not sufficient to render the resin desirable for my purposes. From a number of tests, I discovered that a satisfactory and advantageous type of resin for billiard balls may be made according to the following formula and procedure:

Formula

| | Grams |
|---|---|
| Phenol | 2,000 |
| Formaldehyde | 3,500 |
| $Ba(OH)_2.8H_2O$ | 150 |
| $H_2SO_4$ acid 8.64% | 465 |
| Lactic acid 50% | 56 |
| $BaSO_4$ c. p. (filler) | 1,500 |

Procedure

To the phenol-formaldehyde mixture, of the above stated proportions, and having a pH of approximately 3.4 was added 150 grams of the $Ba(OH)_2.8H_2O$. The pH rose to 8.75 to 9.00. To effect resinification, the solution was heated for 30 minutes at the boiling point followed by immediate cooling on the basic side under vacuum to a temperature of 35° C. The pH at this point was 8.00.

Thereupon sulphuric acid was added dropwise with stirring to a pH of 4.3 with the formation of 111 grs. of colloidally dispersed barium sulphate. The resin at this point was exceptionally light in color and there was no tendency for the resin to separate. While the resin solution was still cool 56 grams of lactic acid 50% was added to lower the pH to below 3. This drop in pH is due to the fact that barium sulphate exerts no buffer action and consequently the addition of small amounts of organic acid have a marked effect upon the lowering of the pH.

The net step in the operation is the addition of the barium sulphate filler to the properly acidified resin. This barium sulphate was prepared by grinding a water paste consisting of 1500 grams of $BaSO_4$ and 2800 grams of water for 15 hours in a porcelain ball mill. This operation reduced the $BaSO_4$ to an exceedingly fine form necessary for its purposes as a filler material in this invention. In addition, the ground $BaSO_4$ contains no iron contamination or other foreign metal which would tend to discolor the finished billiard balls on exposure to sunlight. After the finely ground $BaSO_4$ has been thoroughly mixed with the acidified resin the resulting mixture is filtered to remove all foreign matter.

The mixture is now dehydrated at a temperature of 80° C. under a vacuum of 25 mm. In general, it is advisable to reduce the water content of the resin to below about 6%, such as for example 4%–5%. The dehydrated resin is now ready for casting in hot molds to form the billiard ball stock material.

In addition to the above described beneficial results obtained by the case-hardening treatment, I have found also that this treatment renders the resin material markedly resistant to solutions of alcohol and mineral acids such as sulphuric and hydrochloric acids. For example, billiard ball stock material, which was case-hardened at 95° C. for 72 hours, was tested in 10% and 20% ethyl alcohol, 10% hydrochloric acid and 10% sulphuric acid by immersing the material in these solutions for a period of 30 hours at room temperature. In each instance the surface of the resin material was not impaired. I believe this to be an entirely novel improvement in the manufacture of resinous products and will probably enable varied new commercial uses of this case-hardened resin material when the normally detrimental action of alcohols, acids, etc., are encountered.

For purposes of illustration, but without limiting the scope of the invention thereto, the accompanying drawing shows an outside view, partly broken away, of the billiard ball. This ball has a cured resin core and a case-hardened resin surface, which are integral. The case-hardened surface is one produced by dehydration of the outer portion of the ball as described above.

It is to be understood that various changes and modifications may be made in the foregoing description without departing from the scope of my invention. For example, by proper careful control of the mol ratio, caustic soda may be used in place of the above described barium hydroxide catalyst. Although barium hydroxide catalyst is advantageous for billiard ball resins, other catalysts may be used as indicated. The term "billiard balls" as used in the specification and claims herein is used in a generic sense and is intended to cover various types of billiard and pool balls and balls used in other games and for other purposes. From the foregoing description, it will be apparent that the case-hardening treatment may be applied to various forms of resins and other materials that contain surface water which is removable by heating of the material under vacuum or atmospheric conditions.

What I claim is:

1. A phenol-formaldehyde resin billiard ball characterized by having relatively high resiliency and elasticity and a heat dehydrated case-hardened integral layer of said resin around the periphery of said ball sufficient to prevent the ball from marking a billiard table cloth when said ball is in use.

2. A method of making a case hardened billiard ball from phenol formaldehyde resin having a cellular structure with sufficient water dispersed throughout the cellular mass of resin to provide adequate resiliency and elasticity in the finished ball and having a sufficiently hardened surface to prevent the ball from marking a billiard table cloth when the ball is in play, comprising casting a hydrophilic colloidal solution of the phenol-formaldehyde resin, which contains an appreciable amount of water, curing the cast resin to an insoluble infusible form and subsequently heating the billiard ball made of said cured resin to dehydrate substantially a portion of the cellular resin mass adjacent and including the exterior surface of said ball whereby a case hardened layer of the resin is formed in said portion around said ball which prevents said marking of the table cloth.

3. A method as defined in claim 2, in which the phenol formaldehyde resin has a ratio of at least 1.5 mols of formaldehyde to each mol of phenol.

4. A method as defined in claim 2, in which the colloidal solution of resin prior to casting contains at least about 4% of water.

5. A method as defined in claim 2, in which the surface hardness of the cured resin is about B-25 at 20° C. Rockwell and the surface hardness of the case hardened resin is about B-95 at 20° C. Rockwell.

6. A method as defined in claim 2 in which the billiard balls are case hardened by heating in a substantially non-oxidizing medium to prevent surface oxidation.

7. A method as defined in claim 2, in which the case hardening is effected by heating the cured resin balls covered with sawdust.

8. A method as defined in claim 2 in which the exterior surface of the case hardened layer of the billiard balls is oxidized and this oxidized surface is subsequently removed by machining off an exterior portion of the case hardened layer.

9. A billiard ball having relatively high resiliency and elasticity composed of essentially a cured phenol formaldehyde resin having a cellular structure with water colloidally dispersed substantially throughout the cellular resin mass except for a dehydrated surface layer of said resin around the ball that is case hardened sufficiently to prevent the ball from marking the table cloth when the ball is in play.

10. A billiard ball as defined in claim 9, in which the phenol formaldehyde resin is an alkali-condensed and acidified resin.

11. A billiard ball as defined in claim 9 in which the phenol formaldehyde resin has a mol ratio of at least 1.5 mols of formaldehyde to each mol of phenol.

12. A billiard ball as defined in claim 9 in which the inner cellular portion of the ball contains at least about 4% of water colloidally dispersed throughout the resin mass.

13. A billiard ball as defined in claim 9, in which the phenol formaldehyde resin comprises approximately one part of phenol to at least one and one half parts of formaldehyde condensed and acidified and contains a finely divided inert filler, whereby the ball is stable to light.

WESLEY R. THOMPSON.